(12) United States Patent
Vissing et al.

(10) Patent No.: US 9,278,316 B2
(45) Date of Patent: Mar. 8, 2016

(54) LIQUID MEMBRANE SUITABLE FOR WATER EXTRACTION

(75) Inventors: Thomas Vissing, København (DK); Jesper Søndergaard Hansen, Søborg (DK)

(73) Assignee: AQUAPORIN A/S, Copenhagen (DE)

( * ) Notice: Subject to any disclaimer, the term of this patent is extended or adjusted under 35 U.S.C. 154(b) by 1197 days.

(21) Appl. No.: 13/247,680

(22) Filed: Sep. 28, 2011

(65) Prior Publication Data

US 2012/0152841 A1 Jun. 21, 2012

Related U.S. Application Data

(60) Provisional application No. 61/465,568, filed on Mar. 21, 2011.

(30) Foreign Application Priority Data

Dec. 17, 2010 (DK) .................................. 2010 01133

(51) Int. Cl.
*B01D 61/00* (2006.01)
*B01D 17/00* (2006.01)
(Continued)

(52) U.S. Cl.
CPC .............. *B01D 61/40* (2013.01); *B01D 69/144* (2013.01); *C02F 1/44* (2013.01); *C02F 1/444* (2013.01); *C02F 1/445* (2013.01); *C02F 2103/007* (2013.01); *C02F 2103/08* (2013.01)

(58) Field of Classification Search
CPC .... B01D 61/40; B01D 61/246; B01D 69/144; C02F 1/44; C02F 1/445; C02F 2103/08; C02F 1/26; G02F 1/13363; A61K 2800/594; A61K 8/90; B01J 13/0065; C08L 71/02; C11D 17/003; C11D 11/001; H02K 15/0056; C07K 14/37; B82Y 5/00; C09K 3/00
USPC .............. 210/500.1, 638, 644, 500.23, 321.8; 252/194; 422/68.1
See application file for complete search history.

(56) References Cited

U.S. PATENT DOCUMENTS 3,740,421 A 6/1973 Schmolka et al.
3,897,308 A 7/1975 Li et al.
(Continued)

FOREIGN PATENT DOCUMENTS

WO WO 87/02380 4/1987
WO WO-00/29337 A1 5/2000
(Continued)

OTHER PUBLICATIONS

International Search Report and Written Opinion for International Application No. PCT/IB2011/055635, mailed Apr. 13, 2012 (15 Pages).
(Continued)

*Primary Examiner* — Ana Fortuna
(74) *Attorney, Agent, or Firm* — Clark & Ething LLP

(57) ABSTRACT

A liquid membrane matrix is disclosed in the form of an aquaporin containing bulk liquid membrane matrix (BLM), wherein said liquid membrane matrix is formed from a solution of an amphiphilic copolymer detergent wherein transmembrane proteins have been functionally incorporated and wherein said matrix further contains a stabilizing oil phase. The uses of the membrane matrix include water extraction from liquid aqueous media by forward osmosis, e.g. for desalination of salt water.

28 Claims, 7 Drawing Sheets

(51) Int. Cl.
| | |
|---|---|
| *B01D 11/00* | (2006.01) |
| *C02F 1/26* | (2006.01) |
| *C02F 1/44* | (2006.01) |
| *B01D 61/40* | (2006.01) |
| *B01D 69/14* | (2006.01) |
| *C02F 103/00* | (2006.01) |
| *C02F 103/08* | (2006.01) |

(56) References Cited

U.S. PATENT DOCUMENTS

| | | | | |
|---|---|---|---|---|
| 4,360,448 | A | * | 11/1982 | Li et al. ............... 423/658.5 |
| 5,229,004 | A | | 7/1993 | Skelland |
| 7,014,531 | B2 | * | 3/2006 | Hansen ............... 451/8 |
| 7,424,485 | B2 | * | 9/2008 | Kristiansen et al. |
| 2009/0120874 | A1 | * | 5/2009 | Jensen et al. ............... 210/638 |
| 2010/0196203 | A1 | * | 8/2010 | Sanghera et al. ............ 422/68.1 |
| 2011/0020950 | A1 | * | 1/2011 | Vogel et al. ............... 436/501 |
| 2012/0080377 | A1 | * | 4/2012 | Jensen et al. ............... 210/643 |
| 2012/0152841 | A1 | * | 6/2012 | Vissing et al. ............... 210/643 |
| 2012/0255862 | A1 | * | 10/2012 | Dunnam ............... B82Y 5/00 204/543 |
| 2015/0273407 | A1 | * | 10/2015 | Gil ............... C08K 14/37 210/650 |

FOREIGN PATENT DOCUMENTS

| | | |
|---|---|---|
| WO | WO 2006/122566 | 11/2006 |
| WO | WO 2007/033675 | 3/2007 |
| WO | WO 2009/076174 | 6/2009 |
| WO | WO-2010/146365 A1 | 12/2010 |

OTHER PUBLICATIONS

Cath et al., "Forward Osmosis: Principles, Applications, and Recent Developments," *J. Membrane Sci.* 281:70-87 (2006).
Deamer and Bangham, "Large Volume Liposomes by an Ether Vaporization Method," *Biochim. Biophys. Acta* 443: 629-634 (1976).
Gonen and Walz, "The Structure of Aquaporins," *Q. Rev. Biophys.* 39:361-396 (2006).
Hansen et al., "Large Scale Biomimetic Membrane Arrays," *Anal. Bioanal. Chem.* 395:719-727 (2009).
Hunter and Frisken, "Effect of Extrusion Pressure and Lipid Properties on the Size and Polydispersity of Lipid Vesicles," *Biophys. J.* 74:2996-3002 (1998).
James-Smith et al., Role of Ethylene Oxide and Propylene Oxide Groups of Pluronics in Binding of Fatty Acid to Pluronics in Microemulsions, *J. Surfact. Deterg.* 11:237-242 (2008).
Judge and Bever, Jr., "Potassium Channel Blockers in Multiple Sclerosis: Neuronal $K_v$ Channels and Effects of Symptomatic Treatment," *Pharmacol. Ther.* 111:224-259 (2006).
Karlsson et al., "Reconstitution of Water Channel Function of an Aquaporin Overexpressed and Purified from *Pichia pastoris*," *FEBS Lett.* 537:68-72 (2003).
Laboratory of Membrane Processes Slovakia, http://sschi.chtf.stuba.sk/MembraneLab/Equipment.htm, accessed on Dec. 15, 2011 (6 pages).
Maurer et al., "Spontaneous Entrapment of Polynucleotides Upon Electrostatic Interaction with Ethanol-Destabilized Cationic Liposomes," *Biophys. J.* 80:2310-2326 (2001).
Mayer et al., "Vesicles of Variable Sizes Produced by a Rapid Extrusion Procedure," *Biochim. Biophys. Acta* 858:161-168 (1986).
McGinnis and Elimelech, "Energy Requirements of Ammonia—Carbon Dioxide Forward Osmosis Desalination," *Desalination* 207:370-382 (2007).
Mui et al., "Osmotic Properties of Large Unilamellar Vesicles Prepared by Extrusion," *Biophys. J.* 64:443-453 (1993).
Schiermeier, "Special Report: Purification With a Pinch of Salt," *Nature* 452:260-261 (2008).
Szoka, Jr. and Papahadjopoulos, "Comparative Properties and Methods of Preparation of Lipid Vesicles (Liposomes)," *Ann. Rev. Biophys. Bioeng.* 9:467-508 (1980).
Wang et al., "Characterization of Novel Forward Osmosis Hollow Fiber Membranes," *J. Membrane Sci.* 355:158-167 (2010).
First Technical Examination Report for Danish Patent Application No. 2010 01133, dated Aug. 2, 2011.
Reply to First Technical Examination Report for Danish Patent Application No. 2010 01133, dated Feb. 9, 2012.
Amended Specification for Danish Patent Application No. 2010 01133, dated Feb. 9, 2012.
Hansen et al., "Formation of giant protein vesicles by a lipid cosolvent method," Chembiochem. 12(18):2856-62 (2011).

* cited by examiner

DETAIL B
SCALE (4 : 1)

LIQUID MEMBRANE SUITABLE FOR WATER EXTRACTION

CROSS-REFERENCE TO RELATED APPLICATIONS

This applicant claims benefit of U.S. provisional application No. 61/465,568, filed Mar. 21, 2011, and Danish application no. PA 2010 01133, filed Dec. 17, 2010, both of which are hereby incorporated by reference.

FIELD OF THE INVENTION

The present invention relates to a liquid membrane matrix having incorporated functional protein channels, such as aquaporin or aquaglyceroporin channels or other transmembrane protein pores, for the extraction of water and/or small solutes from aqueous media. More particularly, the liquid membrane matrix is an aquaporin liquid membrane comprising aquaporins incorporated in a tissue-like viscous liquid structure of amphiphilic molecules, particularly for pure water extraction from aqueous liquid media, e.g. in forward osmosis applications.

BACKGROUND OF THE INVENTION

Liquid membrane separation processes have been used for removal of dissolved substances such as ions from aqueous solutions, such as disclosed in U.S. Pat. No. 4,360,448(A). Said invention relates to a process for the removal of dissolved species from aqueous solutions, which comprises contacting said aqueous solution with an emulsion, said emulsion comprising an exterior phase which is characterized as being immiscible with said aqueous solution and yet permeable to said dissolved species, and an interior phase which contains a reactant, such as an ion exchange compound, capable of converting said dissolved species to a non-permeable form. The dissolved species permeate the exterior phase, into the interior phase where they are converted into non-permeable forms and thus retained in the interior phase of said emulsion. The aqueous solution, depleted in said dissolved species, is separated from said emulsion and the emulsion cycled for reuse. However, when multiple or unspecified ions or solutes are present in an aqueous solution or medium, such as a biological liquid it becomes increasingly complex to remove solutes by this or similar methods, since it would be necessary to device a specific reactant for each species to be removed. Another example of the use of a liquid membrane extraction process is described in (WO 87/002380) Production of Low-Ethanol Beverages by Membrane Extraction which relates to membrane extraction systems designed to selectively remove ethanol from wine and other beverages while retaining the water and numerous other organic constituents. Thus, liquid membrane separation methods have hitherto been developed for selective removal of solutes in, e.g. aqueous liquids. Seeing a need to selectively remove or extract water from aqueous liquid sources the present inventors have devised a liquid membrane process suitable to removal or extraction of pure water from an aqueous liquid using the selective water channel known from aquaporin proteins.

Fluorescent-based activity assays are well-established for soluble proteins, but not for membrane proteins. A likely reason for this is that membrane proteins are fragile when they are taken out of their natural environment—the biological membrane. Moreover, the accessibility to commercially available protein species has been restricted to only a few membrane proteins. This is related to the difficulty in expressing and purifying membrane proteins in large quantities (gram-scale). Membrane proteins typically retain their function upon reconstitution into a biomimetic membrane that sufficiently mimics the protein's natural environment. There is today an unmet need for an assay for screening lipid membrane components for their usefulness in the creation of a biomimetic membrane formulation that meets the membrane protein requirements, i.e. specific hydrophilic and hydrophobic regions or layers. At the same time, such an assay would provide useful information about the folding state of a membrane protein.

SUMMARY OF THE INVENTION

The present invention relates to a liquid membrane matrix in the form of a biochannel containing bulk liquid membrane (BLM), wherein the liquid membrane matrix is based on a tissue-like structure comprising cells having biomimetic boundary layers formed from amphiphilic compounds such as non-ionic detergents with or without lipids forming a layer wherein biochannels have been incorporated and wherein said matrix further contains a stabilising oil phase. The invention also relates to methods of preparing said liquid membrane matrix containing functional aquaporin water channels and to novel uses of an aquaporin containing liquid membrane matrix for pure water extraction from liquid aqueous media by forward osmosis, e.g. for desalination of salt water.

In a further aspect, the liquid membrane matrix of the present invention may further be contained or immobilised in a contactor module or in an essentially planar porous sandwich construction useful as a filtering means.

Embodiments of the present invention will now be described by way of example and not limitation with reference to the accompanying figures and examples.

DETAILED DESCRIPTION OF THE INVENTION

Figure 1:
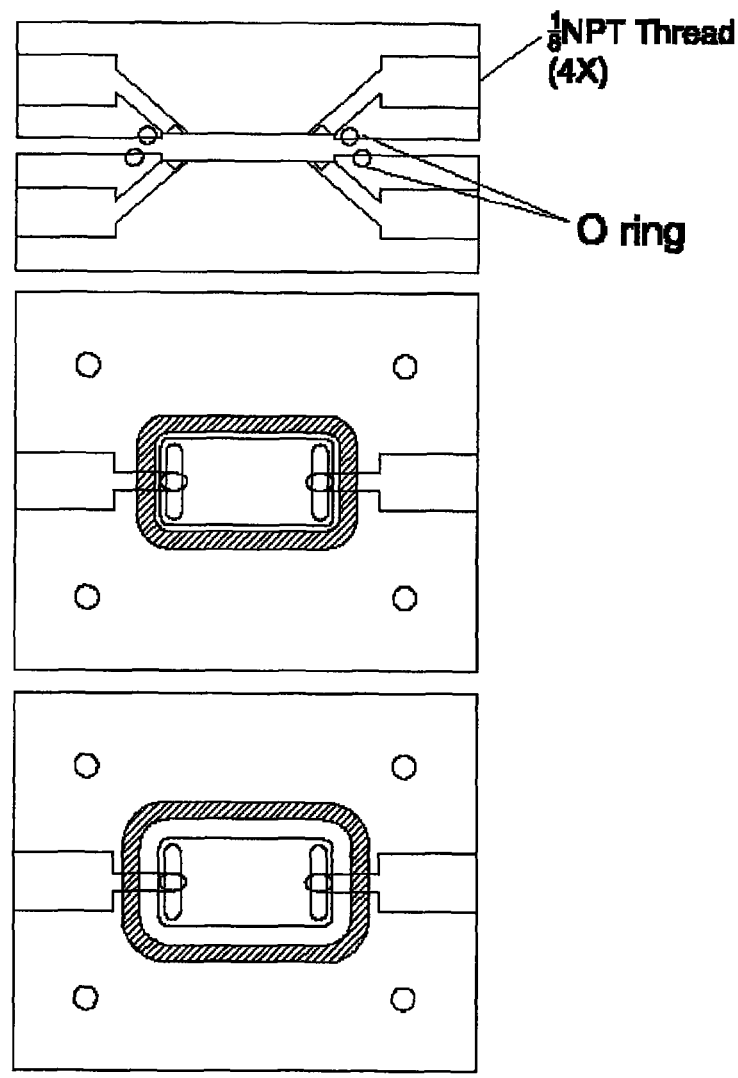
FIG. 1 shows cross section and top view of the two parts of a simple filtration device used in experiments herein.

The liquid membrane matrix described herein may be in the form of an aquaporin containing bulk liquid membrane (BLM), wherein said liquid membrane comprises functional aquaporin water channels incorporated in a dispersion of a non-ionic detergent, such as an amphiphilic block copolymer, preferably of the poloxamer type, where said matrix further comprises a stabilising oil phase.

The invention relates to a liquid membrane matrix consisting of a cellular structure having an internal water phase, an external oil phase, and a boundary layer between cells comprising a nonionic detergent into which transmembrane protein channels have been incorporated. The advantages of this novel liquid membrane matrix is its three dimensional structure allowing many different shapes and sizes, and its coherency providing a water tight material having a very large internal surface area, wherein the boundary layer between the cells exhibit a unique amphiphilicity and sufficient space to harbour amphiphilic substances, such as transmembrane proteins, that are able to be inserted in the layer so as to function properly, i.e. as water channels (aquaporins), proton donors (rhodopsins), etc.

More specifically, the liquid membrane matrix of the invention comprises an oil phase having at least one component selected from the group consisting of a sterol, squalene, squalane, alpha-tocopherol, hopanoids, isoprenes including esterified dolichol, ubiquinone (Q10), jojoba oil, light mineral oils, linseed oil, soybean oil, ground nut oil, phospholipid stabilized squalene or an emulsion of soy bean oil, phospholipids and glycerol, and alkanes, such as decane, undedane, dodecane; and mixtures thereof. Said oil phase greatly assists in the creation of the multicellular structure of the LM matrix of the invention, presumably by forcing the hydrophilic headgroups (or A-chains) of the nonionic detergent into stable structures and stabilizes these structures as can be seen in the microscope images herein. However, the present inventors do not wish to be bound by any specific theory or explanation as to the detailed function of the oil phase.

In the liquid membrane matrix of the invention said detergent is preferably selected from nonionic detergents, such as a hydrophile-hydrophobe-hydrophile (A-B-A) type poloxamers where said poloxamer may be selected from $(PEO)_A$—$(PPO)_B$—$(PEO)_A$ copolymers having an A range of 60-85 and a B range of 25-35, preferably A is an average value of about 76 and B is an average value of about 30. An exemplary poloxamer of use in the invention is sold under the trade name Pluronic F68.

The liquid membrane matrix of the invention may further comprise an amphiphilic lipid component, preferably selected from DOPC, DPhPC, DOPS, or natural lipid extracts, such as *E. coli* total lipid extract, or soybean mixed phospholipids, or combinations or mixtures thereof.

In the liquid membrane matrix of the invention said protein channel can be an aquaporin or aquaglyceroporin water channel, such as a yeast aquaporin, i.a. Aqy1, a plant aquaporin, i.a. SoPIP2; 1, an aquaglyceroporin, i.a. Aqp3, or a bacterial aquaporin, i.a. AqpZ. Other transmembrane proteins may be beta-barrel pores, such as alpha-hemolysin and OmpG, FomA, and VDAC; rhodopsins, such as bacteriorhodopsin, or transmembrane peptide pores, such as alamethicin, valinomycin, and gramicidin A including derivatives thereof and synthetic transmembrane peptides; ion channels, or ion-selective ionophores. In the liquid membrane matrix of the invention said protein channels may be present in a protein to amphiphilic detergent molar ratio in the range of from about 1:50 to about 1:400. This is comparable to the ratios known from work with incorporation of transmembrane proteins such as aquaporin Z in amphiphilic vesicles, cf. WO/2009/076174.

The liquid membrane matrix of the invention will typically exhibit a closed cellular structure having cells with an approximate maximal diameter of up to 1000 µm and the majority of cells lie preferably in the range of about 20 to about 50 µm.

The present invention further relates to a method of extracting water from an aqueous liquid said method comprising the following steps:
   a) placing an amount of an aquaporin containing liquid membrane matrix as disclosed herein into a filter chamber of a filtration device, where said chamber is in controlled connection with a first aqueous liquid acting as the feed solution having an osmotic pressure which is lower than or equal to that of the liquid membrane matrix, and which is further in controlled connection with a second aqueous liquid acting as the draw solution having an osmotic pressure which is higher than that of the matrix thereby creating an osmotic pressure potential between said first and said second liquid,
   b) allowing the matrix to absorb pure water from said first liquid through its aquaporin water channels thereby mediating a pure water flux into said second liquid as long as an osmotic pressure gradient exists,
   c) optionally separating the extracted pure water from said second liquid.

In the above described method said first aqueous liquid may be selected from the group consisting of any type of natural water source, such as sea water, river water, lake water, brackish water, rain water, or waste water which is not toxic to the aquaporin water channels, biological fluids including wine, fruit and vegetable juice, milk, whole blood, plasma, urine, saliva, sweat, homogenized tissue etc.

In a preferred embodiment of the invention the method of extracting water is used for desalination of seawater, wherein salt water is the feed or first aqueous liquid and a $CO_2/NH_3$ containing aqueous solution is the draw solution or second aqueous liquid. Dissolved gasses, such as $CO_2$ or $NH_3$ may be used in the forward osmosis draw solution to create a substantial osmotic gradient, thus driving the water flux through the aquaporins of the liquid membrane matrix, and at the same time possessing the advantage of being readily expelled from the resulting diluted draw solution through heating and evaporation. It is of course obvious to the skilled person of the art to choose other solutes that are useful in a forward osmosis draw solution depending on the desired end uses of the extracted water. Dissolved salts, sugars, sugar alcohols and the like are other useful osmotic pressure creating draw solutes.

The invention also relates to a device or an apparatus for pure water extraction from an aqueous liquid media said apparatus having a filter house comprising one or more aquaporin containing liquid membrane matrices as described herein. Examples are a two module hollow fiber liquid-liquid membrane contactor module (e.g. as disclosed in U.S. Pat. No. 5,328,610) or a liquid cell extra-flow membrane contactor (e.g. as manufactured by Liqui-Cel® Membrane Contactors).

Figure 4:
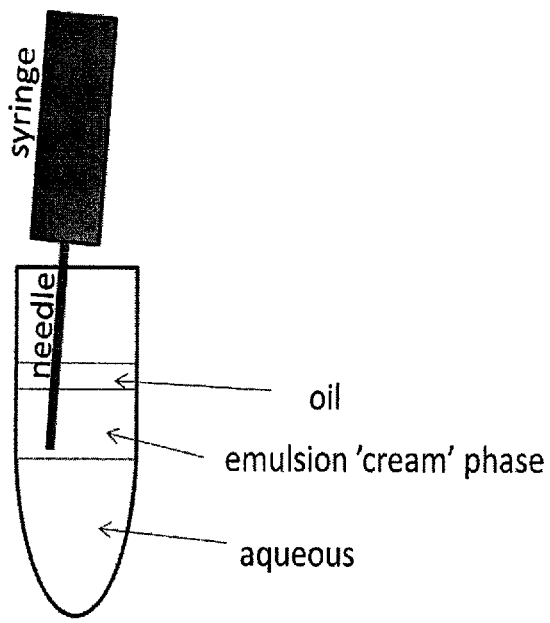
FIG. 4 shows a principle sketch of the extraction by syringe of the liquid membrane matrix of the invention (emulsion 'cream' phase) after phase separation.

The Invention further relates to a method of preparing an aquaporin containing liquid membrane matrix comprising the following steps:
   a) in a glass vial or glass separation funnel mix an aqueous solution of nonionic detergent at about 100 mg/mL and an oil component to obtain an oil/water v/v ratio of 0.25 and adding an amount of an aqueous aquaporin protein solution, where the protein may carry a fluorescent label, to obtain a protein to detergent molar ratio of between 1:50 and 1:400, b) turn the combined mixture from a) in a rolling equipment overnight at room temperature to obtain an emulsion,
c) allow the emulsion from b) to stand for sufficient time to separate into distinct liquid phases including a cream phase or extended oil-water interface which comprises said liquid membrane matrix,
d) take out a matrix sample of the emulsion cream phase with a syringe for injecting into filtration device, e.g. as shown in FIG. 4, and
e) optionally obtain an absorbance spectrum of the matrix formed which is compatible with the fluorescent label used in order to verify correct insertion of the aquaporin protein in the liquid membrane matrix. Alternatively, the emulsion is prepared using homogenization equipment, such as a Heidolph SilentCrusher S wherein the combined mixture from a) is treated at about 45000 rpm for 1 to 2 minutes.

More specifically the invention relates to a method of preparing a liquid membrane matrix suitable for extraction of water from a liquid medium using forward osmosis the method comprising combining an aqueous solution of a non-ionic detergent with an aqueous aquaporin protein preparation and an oil followed by gentle mixing and allowing the resulting emulsion to separate and extract the generated extended oil/water interphase which constitutes said liquid membrane matrix. In said method the detergent is preferably an amphiphilic block copolymer selected from ABA type poloxamers, such as those listed in Table X, said aquaporin protein is aquaporin Z solubilised in a buffer containing aqueous solution, and said oil component is squalene. When using AqpZ (aquaporin Z) said buffer preferably having the following composition: 20 mMTris pH 8+50 mM NaCl+100 mM OG (octyl glucoside) or, alternatively, when sodium or chloride are undesired for the forward osmosis process a 20 mMTris pH 8+100 mM OG buffer combination can be used. In other preferred embodiments using SoPIP2;1 as the aquaporin the buffer may be PBS based, e.g. PBS+1.0% OG, or PBS+1.0% OG. Alternatively, yeast aquaporin Aqy1 may be used where a preferred buffer preparation comprises, e.g.: 20 mM Tris pH 8, 300 mM NaCl and 1% beta-OG. About 1 to 10% of Glycerol is an optional component of these buffer preparations. Since different aquaporin proteins may require different optimal working conditions the skilled person of the art will know how to select a suitable buffer preparation for storage and function of the various aquaporins. Examples of useful non-ionic detergent in the present invention are the compounds disclosed in U.S. Pat. No. 3,740,421, and the poloxamers sold by BASF under the trade names Pluronic F68, Pluronic F77, Pluronic F87, Pluronic F108, Pluronic F127, Pluronic P81, Pluronic P84, and Pluronic P85, cf. also disclosure in Monica A. James-Smith et al. J Surface Deterg (2008) 11:237-242.

The liquid membrane matrix of the invention may comprise an aquaglyceroporin thus making the liquid membrane matrix suitable for both water and glycerol filtration. Incorporation of another transmembrane protein than aquaporins will provide a range of possible uses, other than water extraction, in bioreactors, each specific use being dependent on the biophysical properties of the transmembrane protein selected, e.g. the proton pumps of the rhodopsin family, e.g. bacteriorhodopsin which have interesting properties making them useful in fuel cell applications.

The method of preparing a liquid membrane matrix having incorporated transmembrane proteins may further comprise the addition in step a) of an amphiphilic lipid selected from, e.g. DOPC or DPhPC or DOPS or natural lipid extracts, such as E. coli total lipid extract, or soybean mixed phospholipids, or combinations or mixtures thereof. Up to about two thirds of the non-ionic detergent may be replaced by an amphiphilic lipid such as DPhPC and asolectin.

When using a labeled transmembrane protein, said label is preferably a naphthalene derivative such as those listed in Table 1 herein or a fluorescently functional derivative thereof, e.g. 6-bromoacetyl-2-dimethylaminonaphthalene.

In a preferred embodiment of the invention the liquid membrane matrix comprises incorporated aquaporin water channels, such as aquaporin 2, and is useful for re-extraction of pure water from a patient's plasma lost through hemodialysis. It is a well known problem in external hemodialysis that a large volume of water is lost from the blood plasma being filtered. This water must be replaced, and this poses strict purity requirements in order not to compromise the patient's safety. Using an aquaporin liquid membrane matrix of the invention, wherein the aquaporin is the native human aquaporin 2 which is responsible for the task of reabsorption of water from the kidneys' filtrate amounting to approximately 180 L per day, will eliminate the need for addition of large amounts of external ultra pure water to patients during hemodialysis.

In addition, the invention relates to a supported liquid membrane matrix having a closed sandwich construction, wherein a substantially flat porous filter material provides support on both sides of a layer of said matrix thereby immobilising the layer. This aspect of the invention may take the form of a composite filter membrane or disk created by sandwiching a layer of, e.g., aquaporin containing liquid membrane matrix in between filter materials selected from ultrafiltration membranes and microfiltration membranes. An exemplary material is a non-woven or mesh polypropylene sheet having an active but inert PVDF filtration layer having pore sizes of about 150 nm, such as FSM 0.15 PP manufactured by Alfa-Laval.

Figure 2:
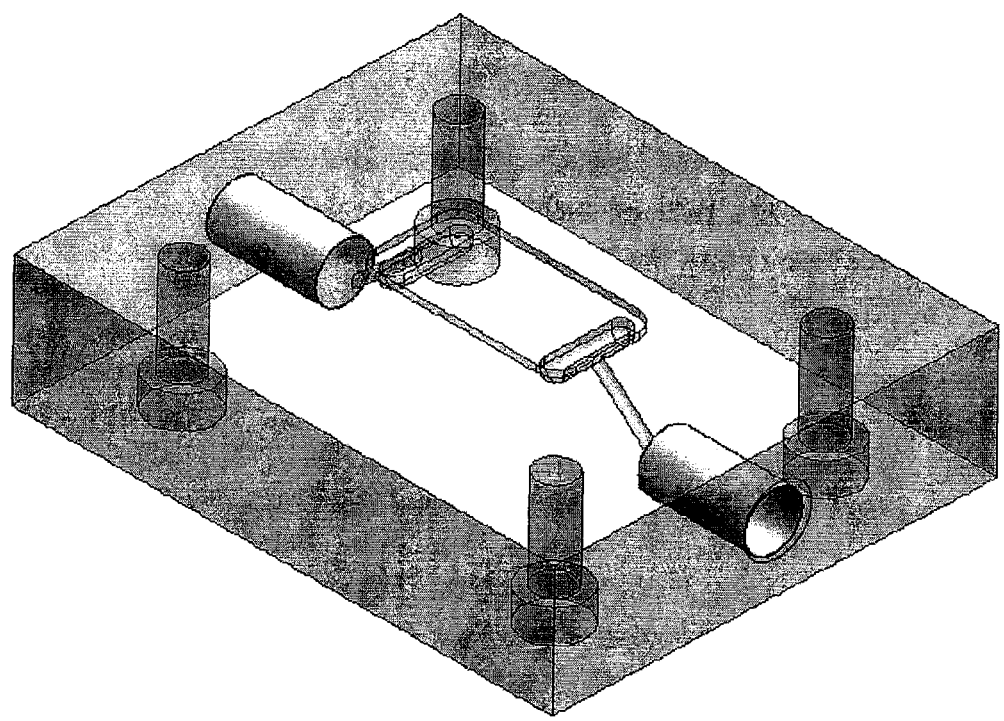
FIGS. 2 and 3 are drawings showing more details of the filtration device of FIG. 1.
Figure 3:
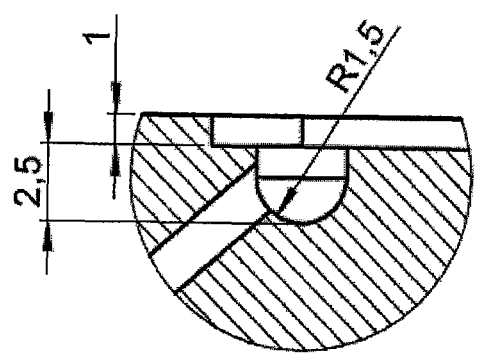

The aquaporin containing liquid membrane matrix of the present invention allows only pure water to pass through its aquaporin water channels, and can therefore be used for osmotic water extraction, e.g. when said matrix is contained in a filtering device which is in up-stream contact with a feed solution or first aqueous liquid having an osmotic pressure which is less than or equal to that of the matrix, and said device being in down-stream contact with a draw solution or second aqueous liquid having an osmotic pressure which is less than that of the matrix. An example of such a filtering device is shown in FIGS. 1, 2 and 3. The extracted water will flow from the feed solution through the matrix and into the draw solution as long as an osmotic gradient is present.

In a preferred embodiment the draw or second aqueous liquid is separable from the product (purified) water, it has low or no toxicity, and it is chemically inert to the liquid membranes. Examples of second aqueous liquids (draw solutions) are mixtures of glucose and fructose that have been used for seawater desalination, and lately draw solutions based on combining ammonia and carbon dioxide gases in specific ratios in highly concentrated draw solutions of thermally removable ammonium salts have been obtained, cf. J. O. Kessler, and C. D. Moody, Drinking water from sea water by forward osmosis, Desalination 18 (1976) 297-306; J. R. McCutcheon, R. L. McGinnis, and M. Elimelech, Desalination by a novel ammonia-carbon dioxide forward osmosis process: influence of draw and feed solution concentrations on process performance. J. Membr. Sci. 278 278 (2006) 114-123), and Method and apparatus for producing potable water from seawater using forward osmosis By Kirts, Richard Eugene. Alternatively, water can be easily separated from the diluted draw solution by heating near 60° C. to yield fresh water, ammonia and carbon dioxide. Both the ammonia and carbon dioxide can then be reused as solutes for the draw fluid, cf. Low (2009).

U.S. Pat. Appl. Publ. (2009), US 2009308727 A1 20091217 discloses a method and apparatus for desalinating seawater which uses an ammonia-bicarbonate forward osmosis desalination process. Seawater is pumped through one side of a membrane assembly, and a draw solution is pumped through the other side of the membrane assembly. The draw solution withdraws water molecules from the seawater through the membrane into the draw solution, and a draw solution separator receives a heated draw solution which then decomposes into ammonia, $CO_2$ and water. Potable water is separated from ammonia and $CO_2$ gas. Subsequently, the ammonia gas and $CO_2$ gas are recombined with a portion of the potable water stream to reform the ammonium bicarbonate draw solution. One embodiment of the present invention is the use of the liquid membrane matrix of the invention in a method and an apparatus as disclosed in US 2009308727 A1. In another embodiment of the invention the aquaporin containing liquid membrane matrix is used in water reextraction from the dialysate resulting from hemodialysis. There are at least two useful applications of the liquid membrane matrix of the invention in improvement of hemodialysis methods:

i) Production of ultrapure water as described herein can replace the very elaborate systems for water purification that are presently necessary in order to restore the water content of the patients plasma.

ii) Following the forward osmosis process used when creating the dialysate large amounts of water stemming from the patient's blood plasma is simultaneously removed, and this may be extracted using an aquaporin liquid membrane in any of the methods described herein.

The aquaporin containing liquid membrane matrix described herein is able to absorb pure water and to release pure water through its aquaporins, e.g. such as in repeated swelling and shrinking cycles, providing that appropriate osmotic gradients are present. Typically, the membrane matrix could be pre-shrunk before being brought into contact with a first aqueous liquid having a lower osmotic pressure than the interior of the membrane matrix, and from which first aqueous liquid it is desirable to extract water. Following separation of the swelled membrane matrix from said first aqueous liquid it is possible to extract the absorbed water into a draw solution having a higher osmotic pressure than the interior of the swelled membrane matrix. M. Goulian et al., Biophysical Journal, Vol. 74, January 1998, pp. 328-337 have shown that the volume of DOPC vesicles containing gramicidin A channels may swell up to about 16% by water transport. It has also been shown for gel-filled DOPC vesicles that the volume may shrink with up to about 80% of the initial volume, cf. A. Viallat et al. Biophysical Journal, Vol. 86, April 2004, pp. 2179-2187.

Typical osmotic pressures of the first aqueous liquid or source or feed phase is in the range of about 100 mOsm to about 500 mOsm or 1000 mOsm, and typical osmotic pressures of the second aqueous liquid or receiving or draw phase are about 100 to 1000 mOsm higher in order to obtain a suitable osmotic pressure difference. The osmolality of sea water ranges from 2000-2400 mOsm, primarily contributed by sodium chloride. This is 8 times the normal osmolality of blood plasma, which is about 275-299 milli-osmoles per kilogram. The most concentrated urine our kidneys can produce ranks at 1400 mOsm, far below the level of ocean water.

In addition to incorporation of natural and engineered aquaporin water channels, the liquid membrane matrix of the invention may comprise other types of biochannels, i.a. beta-barrel pores such as alpha-hemolysin and OmpG, FomA, VDAC; transmembrane peptide pores (alamethicin, valinomycin, gramicidin A) including synthetic peptides, ion channels, as reviewed by Boon, M. and Smith, B D; 2002 ("Synthetic membrane transporters". Current Opinion in Chemical Biology 2002, 6:749-756), and ion-selective ionophores such as sodium selective ETH 157, potassium selective SQI-Pr and valinomycin, chloride ionophore Trioctyltin chloride and the like.

The liquid membrane matrix of the invention comprises a stabilising oil phase, such as an oil phase comprising non-polar hydrocarbon solvents, e.g. having unbranched or branched carbon chains of 6 to 12 carbon atoms. Oil phase compounds of low toxicity are also preferred. Natural oil compounds, such as soybean oil (cas No. 8001227) and peanut oil both preferably in analytical standard, are known to form relatively stable emulsions exhibiting physical stability and being non-toxic. These oils further include squalene, squalane, alpha-tocopherol, hopanoids, isoprenes (e.g. esterified dolichol), ubiquinone (Q10), jojoba oil, light mineral oils, linseed oil, phospholipid stabilized squalene, or an emulsion of soy bean oil, phospholipids and glycerol, Intralipid™, and the like. In addition, higher alkanes, such as decane, undedane, dodecane etc. can be used in the oil phase either alone or in admixture with the previously mentioned oil phase compounds. It is preferred in this invention to reduce the content of organic solvents to obtain a solvent less or even solvent free liquid membrane matrix composition.

DEFINITIONS

The term liquid-liquid extraction is used for a separation process using liquid membranes. In the present invention this is a liquid-water extraction, as water is extracted into a liquid membrane.

Using a liquid membrane the general term "water extraction" will be used herein together with the general term "water separation".

Biomimetic: The membrane matrix of the invention is characterised in having a biomimetic amphiphilic membrane which is suitable for insertion of and integration of a transmembrane protein. Preferably, the transmembrane proteins retain their native three-dimensional conformation when integrated in the biomimetic membrane, and thus, the protein retain its functionality.

The term "lipid" as used herein covers preferably amphiphilic lipids, e.g. phospholipids, phosphoglycerides, sphingolipids, and cardiolipin, as well as mixtures thereof, e.g. phospholipids such as 1,2-dipalmitoyl-sn-phosphatidyl-choline (DPPC), DOPC, DPhPC, DOPS, natural lipid extracts, such as *E. coli* total lipid extract, soybean mixed phospholipids, or mixtures of phospholipids. Examples of useful lipids are listed in Table 1 in WO/2006/122566, which is incorporated herein by reference.

The term "biochannel" as used herein shall mean any membrane spanning channel or pore, such as protein channels that can be incorporated into a biomimetic amphiphilic layer for the extraction of water and/or small solutes from a liquid aqueous medium.

The term "aquaporin" as used herein shall mean any functional water channel, such as the transmembrane proteins described in WO/2006/122566 "Membrane for filtering of water" and by Tamir Gonen and Thomas Walz, Quarterly Reviews of Biophysics (2006), 39:4:361-396, Cambridge University Press. A preferred aquaporin protein as used herein is selected from the group consisting of Aqp 4, Aqp 1, Aqp Z, SoPIP2; 1 and monomeric, dimeric, tetrameric and higher oligomers as well as functional variants thereof including mutated, conjugated and truncated versions of the primary sequence, e.g. engineered variants of specific aquaporins that are optimised for heterologous expression.

The terms "aqueous liquid" and "aqueous liquid media" are used herein to encompass aqueous solutions; natural water sources; liquids of biological origin such as fruit and vegetable juices, blood, milk and urine; waste water sources; aqueous suspensions, dispersions, emulsions and the like.

The term "osmotic pressure" as used herein shall mean the pressure generated by the osmotic flow of water from an aqueous liquid through a semi-permeable membrane into a compartment containing aqueous solutes at a higher concentration. Potential osmotic pressure is the maximum osmotic pressure that could develop in a solution when separated from distilled water by a selectively permeable membrane. The potential osmotic pressure is determined by the number of solute "particles" in a unit volume of the solution as described by the van't Hoff equation.

The term "forward osmosis" (FO) signifies a process where the osmotic pressure differential across a semipermeable membrane is the driving force for transport of water through the membrane. The FO process results in concentration of a feed stream and dilution of a highly concentrated stream (referred to as the draw solution), cf. Cath et al., Journal of Membrane Science, 281 (2006) 70-87.

The term "first aqueous liquid" corresponds to "feed" liquid or the source phase.

The term "second aqueous liquid" corresponds to "draw" liquid or the receiving phase, also known as stripping solution.

The term "standard form factors" usable with liquid membranes as described herein shall mean the modern industry device and apparatus standards for liquid membrane extraction equipment.

The term "liquid membrane contactor" as used herein shall mean a device or composition that will allow two or more liquid phases to come into contact with each other for the purpose of mass transfer between the phases, e.g. through an aquaporin bulk liquid membrane. Examples of contactors as used herein include hollow fiber modules incl. two module hollow fiber modules, hollow sheet membranes useful in membrane bioreactors, e.g. Hollow Sheet Membrane for MBR manufactured by Alfa-Laval, multibundle hollow fiber contactors, such as Liqui-Cel™ contactors, a Hollow fiber pertractor and a Two chamber contactor system, cf. http://sschi.chtf.stuba.sk/MembraneLab/Equipment.htm

Specific Embodiments

Use of the aquaporin containing liquid membrane matrix of the invention is especially advantageous in production of pure or fresh water from desalination of saline feed solutions, such as sea water, where the specific pure water transporting and chloride rejecting properties of the aquaporin water channels offer unique process conditions. An interesting embodiment of the invention is the use of aquaporin liquid membrane matrices in a forward osmosis process for the production of fresh water, where salt water is the feed and a $CO_2/NH_3$ containing aqueous solution is the draw solution having the advantage of easy elimination of the dissolved gases through heating to about 58° C., cf. McGinnis and Elimelech, Desalination, 207 (2007) 370-382; and Quirin Schiermeier, "Purification with a pinch of salt", Nature, 452, 20 Mar. 2008.

A typical composition of a liquid membrane matrix of the invention which is ready for use is shown in Table 1.

TABLE 1

| Components pr. liter aquaporin liquid membrane |
| --- |
| ~0.2% of protein (calculated for aquaporin)/liter membrane) + ~0.2% of low molwcular weight detergent (calculated for octyl glucoside) |
| ~7.7% of non-ionic detergent/liter membrane |
| ~70% of water/liter membrane (internal aqueous phase) |
| ~22% of oil phase component (external oil phase) |

The invention is illustrated in the FIGS. 1 to 12 which are explained in detail below:

FIG. 1 shows cross section and top view of the two parts of a simple filtration device used in experiments herein.

FIGS. 2 and 3 are drawings showing more details of the filtration device of FIG. 1.

FIG. 4 shows a principle sketch of the extraction by syringe of the liquid membrane matrix of the invention (emulsion 'cream' phase) after phase separation.

Figure 5:
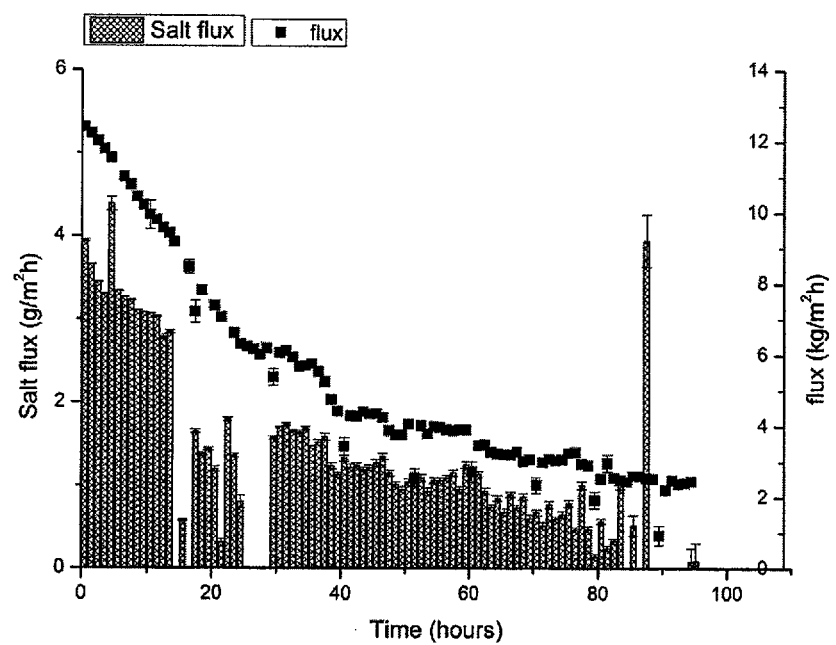
FIG. 5 is a graph showing achieved water flux and salt flux in a prior art forward osmosis experiment.

FIG. 5 is a graph showing achieved water flux and salt flux in a prior art forward osmosis experiment.

Figure 6:
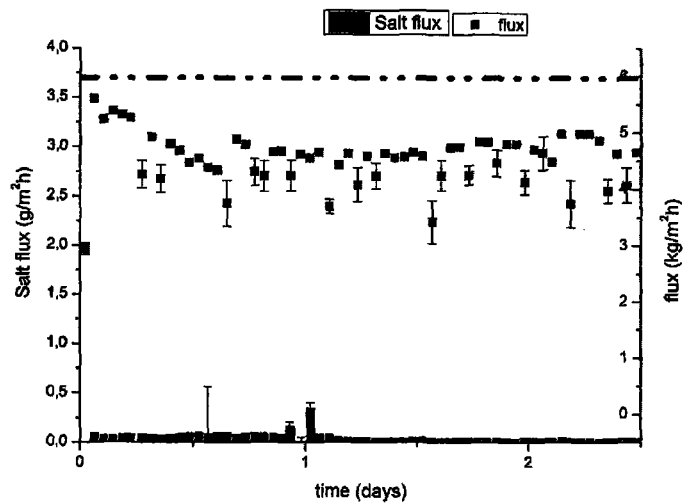
FIG. 6 is a graph showing achieved water flux and salt flux in a forward osmosis experiment using the liquid membrane matrix of the invention.

FIG. 6 is a graph showing achieved water flux and salt flux in a forward osmosis experiment using the liquid membrane matrix of the invention. The experiments behind FIGS. 5 and 6 were conducted using the device of FIGS. 1, 2 and 3 and a cross flow filtration set-up as shown in FIG. 7.

Figure 7:
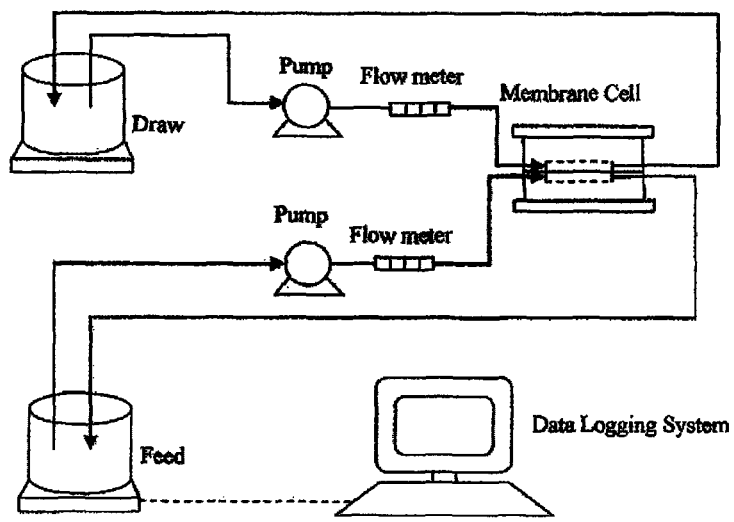
FIG. 7 is a principle sketch of a cross flow forward osmosis set-up showing the device holding the sandwiched liquid membrane (membrane cell).

FIG. 7 is a principle sketch of a cross flow forward osmosis set-up showing the device holding the sandwiched liquid membrane (membrane cell).

Figure 8:
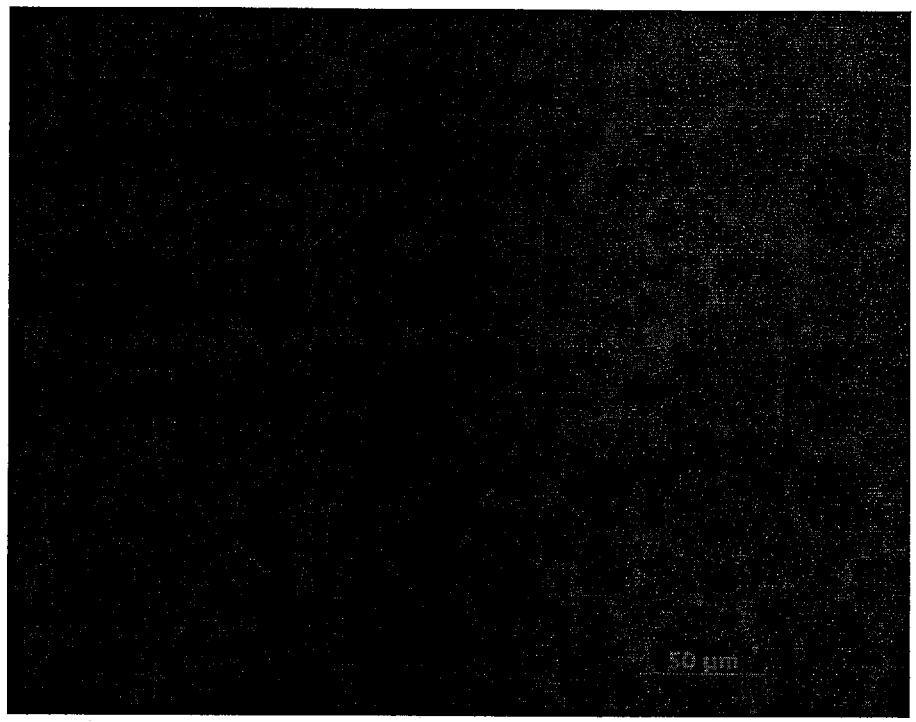
FIG. 8 is a microscope 20× magnification photograph of aquaporin Z containing liquid membrane matrix sample of the invention showing blue Badan™ fluorescence from labelled aquaporin Z limited to boundary layers only.

FIG. 8 is a microscope 20× magnification photograph of aquaporin Z containing liquid membrane matrix sample of the invention showing blue Badan™ fluorescence from labelled aquaporin Z limited to boundary layers only.

Figure 9:
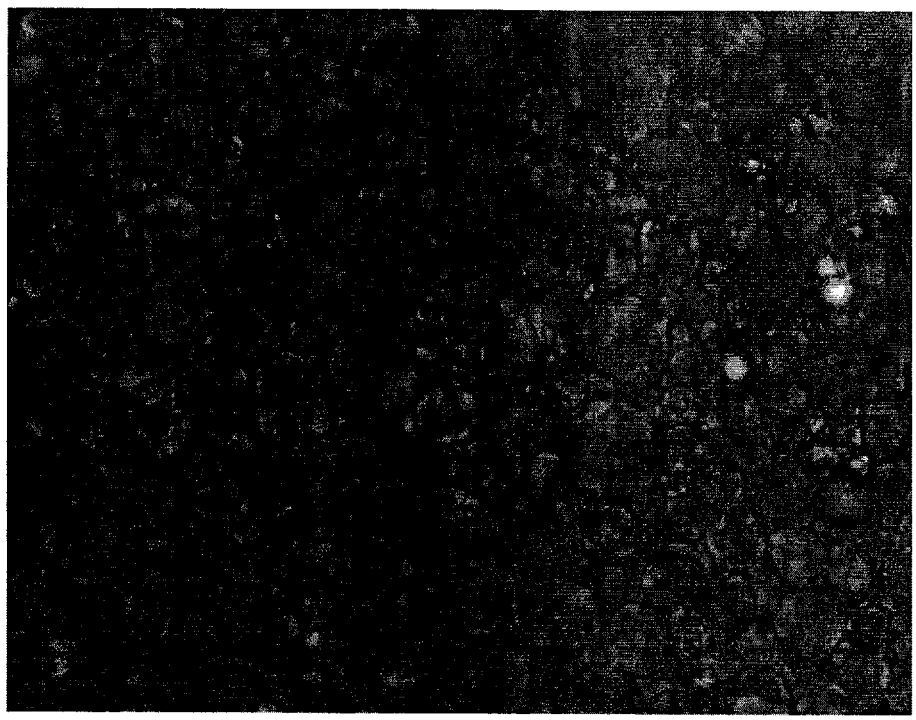
FIGS. 9 and 10 are the same as FIG. 8 but showing bright field images.
Figure 10:
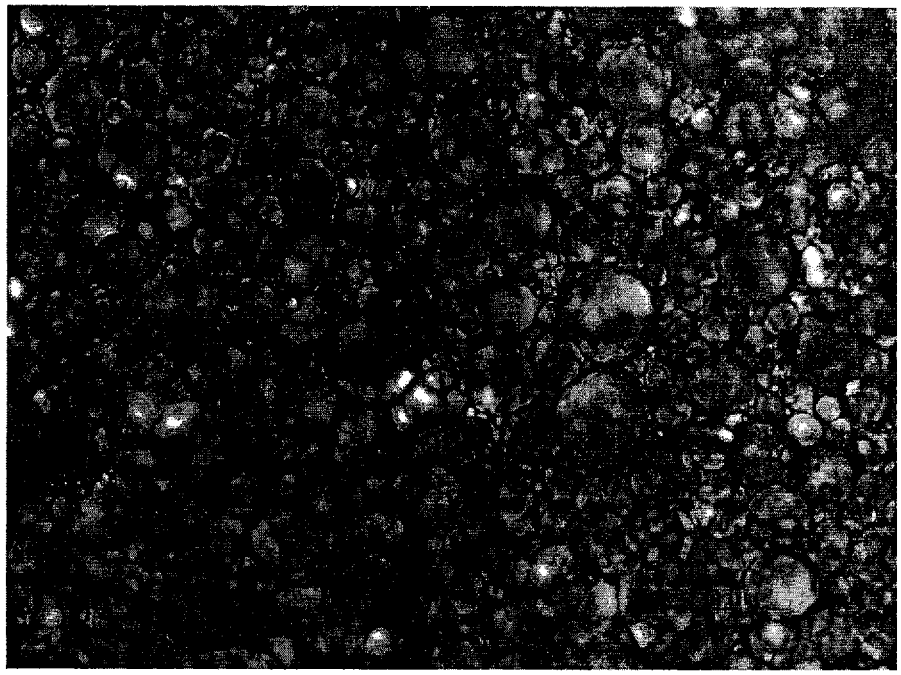

FIGS. 9 and 10 are the same as FIG. 8 but showing bright field images. The cell like structure of the membrane matrix can be clearly seen.

Figure 11:
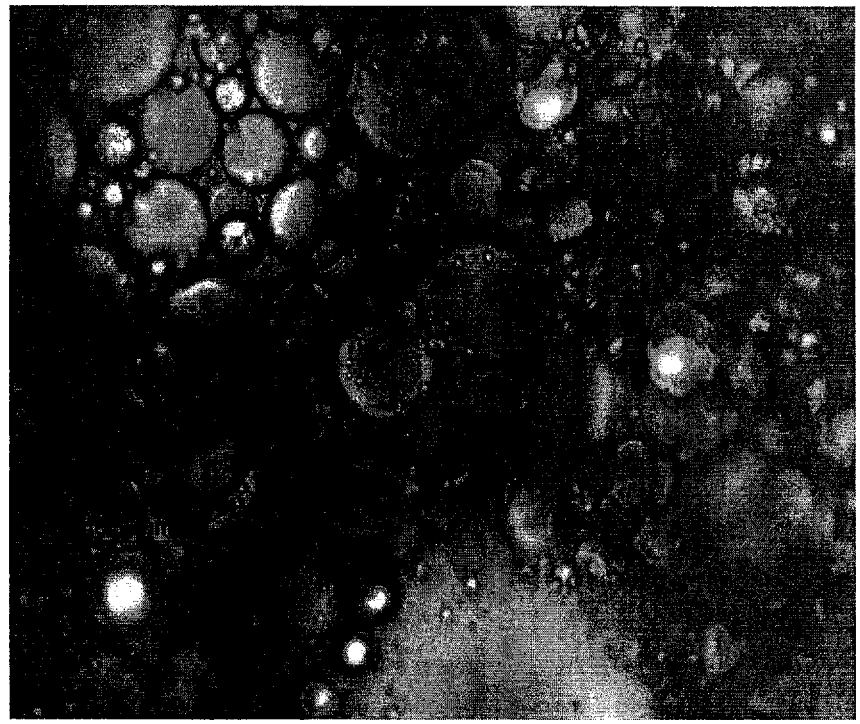
FIG. 11 is the same as FIG. 9 but showing a 'cream' phase without incorporated proteins.

FIG. 11 is the same as FIG. 9 but showing a 'cream' phase without incorporated proteins. Here the emulsion is typically made up of vesicles.

Figure 12:
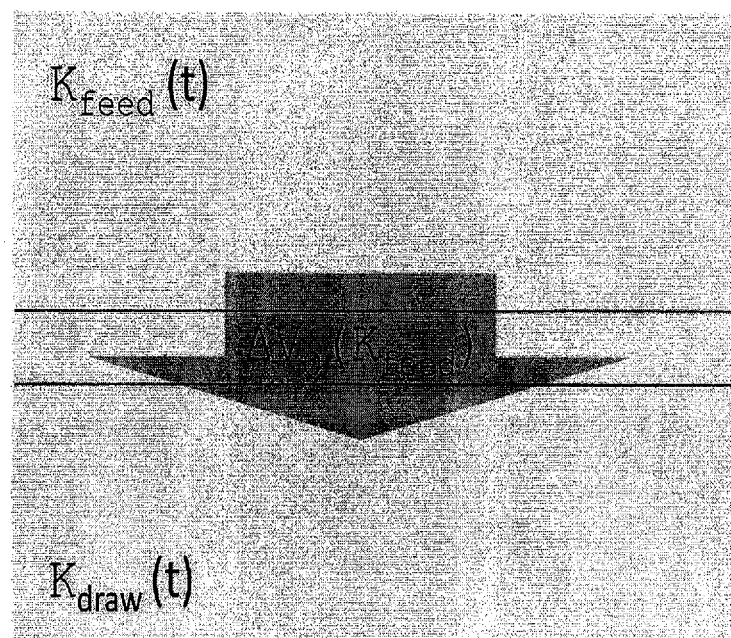
FIG. 12 is a schematic illustration of a forward osmosis unit cell.

FIG. 12 is a schematic illustration of a forward osmosis unit cell where $K_{feed}(t)$ is used for measured conductivity of the feed solution, $K_{draw}(t)$ is used for measured conductivity of the draw solution, and $\Delta V_Q(K_{permeate})$ is used for the volume of measured flow from feed. The broad arrow indicates direction of flow through the liquid membrane space.

An additional aspect of the invention is a method of providing a nutrient drink comprising pure drinking water through forward osmosis using an aquaporin liquid membrane matrix as the carrier system. As an example, the aquaporin liquid membrane matrix will extract water from a urine solution into the aquaporin liquid membrane. The aquaporin liquid membrane matrix and the concentrated urine solution will be phase separated following which the aquaporin liquid membrane matrix will be contacted with a receiving aqueous solution with a higher osmotic gradient. Water will then be extracted from the aquaporin liquid membrane matrix into the receiving solution, and the aquaporin liquid membrane matrix and the receiving solution will be phase separated giving an end result of transfer of water from a urine solution to another solution, in this example being a solution of glucose and protein.

In a still further aspect the invention relates to the use of the membrane matrix of the invention in forward osmosis following ultrafiltration of a uniform electrolyte or for degassing of dissolved gasses. This is an example of a complete application of water extraction from any aqueous solution or liquid. As an example, the aquaporin containing liquid membrane matrix will extract water from a waste water solution into the aquaporin liquid membrane matrix. The aquaporin liquid membrane and the concentrated waste water solution will be phase separated following which the aquaporin liquid membrane matrix will be contacted with a receiving aqueous solution with a higher osmotic gradient. Water will then be extracted from the aquaporin liquid membrane into the receiving solution, and the aquaporin liquid membrane matrix and the receiving solution will be phase separated, giving an end result of transfer of water from a waste water solution to another solution, in this example being a solution of another electrolyte or a solution of dissolved gasses.

Calculations

The following formulae can be used in measurements of flux and calculation of rejection rate across the forward osmosis batch cell unit.

Flow: $Q(t) \approx \Delta V(t)$ where $\Delta V(t)$ is read from a measuring pipette Flux is calculated as:

$$J(t) \approx \frac{Q(t)}{A}$$

where A is liquid membrane contact area

Flux as function of osmotic pressure:

$$J(t) \approx \frac{Q(t)}{A * P_{osmotic}}$$

Osmotic pressure calculation for a solution of individually moving solute molecules:

ΠcRT [chapt 2.11 in 'Quantities, Units and Symbols in Physical Chemistry,' INTERNATIONAL UNION OF PURE AND APPLIED CHEMISTRY, 1993]

c: molarity of individual moving solute

R: gas constant, 0.08206 L·atm·mol$^{-1}$·K$^{-1}$

T: absolute temperature

For solutions deviating from ideality, the above equation becomes:

Π=ϕcRT where ϕ is the osmotic coefficient. For a 0.15 M sucrose solution at 25 deg celsius ϕ=1.01. [Sten-Knudsen, 'Stoftransport, membranpotentialer og elektriske impulser over biologiske membraner' Akademisk Forlag 1995]. ϕ may be determined from osmometry for particular solutions.

Example

Osmotic pressure (in bar) of a 0.2 M sorbitol (D-sorbitol) at ambient temperature of 22 deg celsius:

Π=ϕcRT~1·0.2 mole·L$^{-1}$·0.08206 L·atm·mol$^{-1}$·K$^{-1}$·295 K·1.01325 bar·atm$^{-1}$=9.9 bar ϕ is here assumed to be ≈1.

Salt Rejection, cf. FIG. 12:

By using draw and feed solutions containing fully ionized, strong electrolytes, the conductivity, κ, is here used as a simple concentration measure. An increase in draw solution conductivity reflects the amount of permeated ions in permeate volume, Q(t), diluted into the draw volume ($V_0$ is initial draw volume):

$$\kappa_{permeate}(t) = \Delta\kappa_{draw}(t) * \frac{V_0 + Q(t)}{Q(t)}$$

A bulk R ('salt rejection') may be defined as:

$$R = 1 - \frac{\kappa_{permeate}(t)}{\kappa_{feed}(t)}$$

FIG. 6 is a graph showing achieved water flux and salt flux in a forward osmosis experiment from a feed liquid consisting of MilliQ water to a draw solution of 1 M NaCl through a composite filter membrane or disk created by sandwiching a layer of liquid membrane matrix of the invention having incorporated Aqp Z in between selected filter material, i.e. FSM 0.15 PP. FIG. 6 clearly shows a very low and consistent salt flux at around 0.1 g/m$^2$ h which compares favourably with the salt flux shown in FIG. 5 starting at about 5.5 g/m$^2$ h and obtained with a state of the art FO membrane having a pore size of 1 to 5 nm (FO Seapack™ membrane from Hydration Technologies (HTI)) using the same equipment, cf. Ex. 3. The water flux in FIG. 6 is stable between 4 and 5 kg/m$^2$ h during the period compared to the rapidly diminishing water flux of the HTI membrane. In FIGS. 5 and 6, the forward osmosis device used is as shown in FIGS. 1, 2, and 3 and consists of two parts (upper and lower) that can be fitted around a central part containing the liquid membrane matrix, which is injected through a needle in between two filter support sheets immediately before tightening the screws and sealing of the device. The volume in between the membranes is defined by the spacer/membrane holder. Feed solution and a draw solution are continuously being pumped across the membrane in a counter current mode according to the principle sketch shown in FIG. 7, cf. Tang et al., Journal of Membrane Science, Volume 354, Issues 1-2, 15 May 2010, Pages 123-133.

Supported liquid membranes according to the invention may also take the form of an open or closed sandwich construction, wherein a substantially flat porous filter material provides support on one or both sides of a layer of liquid membrane matrix, thus immobilising said layer. Examples of filter material are listed in Table 2 below. In addition, a ceramic membrane, such as SpinTek Td, may be used as support. This membrane type is made from a 185 μm thick stainless steel substrate unto which a thin (15 μm) nanopowder coating of ceramic is bonded to the substrate. The ceramic coating has a smooth surface that resists fouling and is therefore of interest. The Td ceramic membrane is available in pore sizes as small as 0.07 μm and as large as 0.8 μm suitable for support of the liquid membrane matrix of the invention. The base ceramic of the Td membrane is titanium dioxide (TiO$_2$) manufactured from nano-sized ceramic powders. This can be blended with either zirconia or with a composite of alumina and silica dioxide depending on the intended service.

TABLE 2

List of alternative filters with indication of type, producer and pore selectivities

| membrane type | producer | brand name | pore specs. size/ cut-off Da |
|---|---|---|---|
| (MF) -s, unlaminated | Sterlitech | PTFE | 0.200 μm |
| (MF)-as | Sterlitech | PTFE | 0.200 μm |

TABLE 2-continued

List of alternative filters with indication
of type, producer and pore selectivities

| membrane type | producer | brand name | pore specs. size/cut-off Da |
|---|---|---|---|
| NF-s | Sterlitech | PTFE | 0.450 µm |
| MF-s | Millipore | Durapor | 0.450 µm |

List of abbreviations:
MF: microfiltration,
NF: nanofiltration,
-as: asymmetric,
-s: symmetric In addition to the specific embodiments of the present invention as illustrated by the figures herein the liquid membrane matrix of the invention is useful in bioreactors [any examples??] and in a biosensor application for detection of compounds having a biochannel modulating effect, such as inhibition and activation, and for drug screening. An example would be incorporation of a functional potassium channel in an immobilised liquid membrane matrix preparation, and screening compound libraries for inhibition or blocking of the channel. Judge S I and Bever C T have shown this principle for the identification of drugs that are useful in the treatment of multiple sclerosis, cf. references section.

EXPERIMENTAL SECTION

Example 1

Preparation and Extraction of Aqp-Z Bulk Liquid Membrane Matrix

Purified Aqp-Z was obtained according to the method described below. Alternatively, SoPIP2; 1 can be used, e.g. as obtained according to the methods described by Maria Karlsson et al. (FEBS Letters 537 (2003) 68-72).
Materials and Chemicals
Non-ionic detergent PluronicF68 obtainable from BASF
13 mg/mL of a Aquaporin Z (Aqp-Z) batch (or alternatively SoPIP 2; 1)
PBS Buffer (Sigma P5368): 0.01M phosphate buffered saline (NaCl 0.138 M; KCl–0.0027 M); pH 7.4, at 25° C.
Milli-Q water
Oil phase component, squalene
Separation Funnels/glass vials
Gas-tight glass syringes
Draw/feed solutions (1M NaCl/Milli-Q water)
Prototype cross-flow chamber assembly according to FIGS. 1, 4 and 5 herein
LabRoller™ rotator (Labnet International, Inc.)
Preparing a mL sized aqp-Z liquid membrane matrix at the following conditions:
Use a molar ratio of non-ionic detergent:aquaporin of 200; use an oil-to-water volumetric ratio of 0.25; using an Aqp-Z batch at 10.6 mg/mL (2 mg total); and where the oil (or oil phase component) is pure squalene; and using the following steps:
1. In a 4 mL round-bottomed glass vial of 4 mL or glass separation funnel (3 mL) add:
    i) A solution of non-ionic detergent in PBS or other suitable buffer at 100 mg/mL at room temperature.
    ii) Add protein (189 µL AqpZ) to 1527 µL of non-ionic detergent and finally
    iii) 572 µL of squalene.
2. Mix the sample by gently pipetting in/out of pipette tip (1000 µL pipette.)
3. Optionally: Gently flush the sample by a stream of nitrogen before closing the cap on the vial.
4. Turn the sample overnight on a LabRoller at room temperature. After rolling, let the sample stand for 1 hour before use.
5. Take out sample, 350 µL of the emulsion 'cream' phase close to the emulsion-water interfase, with a 500 µL gas-tight glass syringe (26 gauge blunt-end needle with side port) for injecting into cross-flow cell (cf. FIG. 1, 2, 3) using the additional steps of:
    1. Assemble the cross-flow cell with encapsulation filters in the BLM cavity and gaskets (3 pieces)
    2. Allow a needle to be able to insert into the sample compartment
    3. Insert the syringe with sample, ejection port facing the open volume of the sample compartment and tighten the cell
    4. Slowly inject up to ~350 µL of the sample
    5. Draw out the syringe and completely tighten the cell screws.

The cross-flow cell with liquid membrane matrix is now ready for mounting in a forward osmosis cross-flow setup.

Aquaporin Z (AqpZ) was obtained according to the method described below:

Bacterial aquaporin-Z (AqpZ) was overproduced in E. coli strain BL21(DE3) cultures as His-tagged protein with a tobacco etch virus cleavage site. The fusion protein has 264 amino acids and a $M_w$ of 27,234 Da. Genomic DNA from E. coli DH5α was used as a source for amplifying the AqpZ gene. The AqpZ gene was amplified using gene specific primers with the addition of a tobacco etch virus cleavage site (TEV); ENLYFQSN at the N-terminus of AqpZ. The amplified AqpZ was digested with the enzyme NdeI and BamHI and then ligated to the similarly digested 6-His tagged expression pET28b vector DNA. The positive clones were verified by PCR-screening. Then the authenticity of the constructs was confirmed by DNA sequencing.

The E. coli strain BL21(DE3) was used for expression of the protein. Luria Broth cultures containing 50 µg/ml Kanamycin were incubated for 13-16 hours at 37° C., diluted 100-fold into fresh LB broth and propagated to a density of about 1.2-1.5 (OD at 600 nm). Expression of recombinant protein was induced by addition of 1 mM IPTG for 3 hour at 35° C. before centrifugation.

Harvested cells were resuspended in ice-cold binding buffer (20 mM Tris pH 8.0, 50 mM NaCl, 2 mM β-mercaptoethanol, 10% glycerol) in the presence of 0.4 mg/ml lysozyme, 50 units Bensonase and 3% OG. The sample was subjected to five times lysis cycles in a microfluidizer at 12,000 Pa. Insoluble material was pelleted by 30 minutes centrifugation at 40,000×g. The supernatant was passed through a Q-sepharose fast flow column (Amersham Pharmacia), and the flow through was collected. The flow though fraction was topped up with NaCl to 300 mM before loaded onto a pre-equilibrated Ni-NTA column. The column was washed with 100 column volumes of a wash buffer (20 mM Tris pH 8.0, 300 mM NaCl, 25 mM Imidazole, 2 mM β-mercaptoethanol, 10% glycerol) to remove non-specifically bound material. Ni-NTA agarose bound material was eluted with five bed volumes of elution buffer (20 mM Tris pH 8.0, 300 mM NaCl, 300 mM Imidazole, 2 mM β-mercaptoethanol, 10% glycerol, containing 30 mM n-octyl β-D-Glucopyranoside. AqpZ was further purified with anion exchange chromatography; monoQ column (GE healthcare). The mixture sample was diluted and concentrated to bring the salt and imidazole concentration to approximately 10 mM with Amicon concentrator, molecular weight cut off (MWCO) of 10,000 Da before loading to MonoQ column. The buffer used during anion exchange chromatography were (A) 20 mM Tris pH 8.0, 30 mM OG, 10% glycerol and (B) 20 mM Tris pH 8.0, 1M NaCl, 30 mM OG, 10% glycerol. The eluted peak fractions containing AqpZ from the ion exchange column was pooled. The purified AqpZ was kept frozen at −80° C.

Example 2

Application of Bulk Liquid Membrane Matrix as Prepared in Ex. 1

The BLM preparations of the invention can suitably be incorporated in a hollow fiber module designed for concentration driven liquid-liquid mass transfer, e.g. a Liquid-Cel extra-flow 10×28 contactor as described in section 4.21 and shown in FIG. 4.1(b) in Manuel Aguilar & Jose Luis Cortina "Solvent Extraction and Liquid Membranes", CRC Press, 2008, the contents of which is incorporated herein. The liquid membrane emulsion of the invention can be incorporated in the microporous hollow fibre membranes, and using salt water as the feed fluid and a suitably concentrated draw fluid pure or desalinated water can be extracted from the salt water feed.

Example 3

Use of a Filter Device in the Form of a Housing Unit as Shown in FIGS. 1, 2 and 3 for a Forward Osmosis Process Across an Aquaporin Containing Liquid Membrane Matrix In an assembled unit two Alfa Laval microfiltration membranes, Alfa Laval-FSM 0.15 PP, are used as support of the liquid membrane matrix in the filtering compartment. For draw solution a 0.8 M sorbitol (D-sorbitol, 85529 Sigma BioUltra) can be used. Sample volume is 500 µL of a sandwiched liquid membrane matrix. A phosphate buffered saline (PBS) solution, Sigma P-5368 (0.138 M NaCl, 0.0027 M KCl, 0.01M of mono- and dibasic potassium phosphates and sodium phosphates) is used as feed. Alternatively, a feed/draw combination of MilliQ water/1M NaCl solution may be used.

Experiment start time is at addition of feed solution with stirring of draw on. Observables are the position of the water column in the measuring tubes. Through the measuring tubes a probe is inserted at points-in-time to measure conductivity of either draw or feed solution (Microelectrodes Inc. MI-900 Conductivity electrode, Thermo Scientific Orion 3-Star Conductivity meter). The rise of the draw column over time is measured and from that flow rates and flux may be calculated appropriately, as mass per area and mass per area per unit of time. Conductivity is measured at both feed and draw in parallel to water column rise.

Example 4

Preparation of Aquaporin for Incorporation in a Liquid Membrane Matrix

The spinach aquaporin SoPIP2; 1 protein was obtained from Professor Per Kjellbom and Urban Johansson at The Department of Biochemistry at Lund University in Sweden, and was expressed and purified according to Törnroth-Horsefield et al. 2006 (Susanna Törnroth-Horsefield et al. 2006. Structural mechanism of plant aquaporin gating, vol 439, Nature, pp. 688-694).

The bacterial aquaporin-Z from *E. coli* was obtained for Associate professor Jaume Torres, *Division of Structural & Computational Biology*, School of biological Sciences, Nanyang Technical University, Singapore. Functional aquaporin-Z was overproduced in *E. Coli* strain BL21(DE3) bacterial cultures as His-tagged protein with a tobacco etch virus cleavage site. The fusion protein has 264 amino acid and a Mw of 27234 Da. Genomic DNA from *E. coli* DH5α was used as a source for amplifying the AqpZ gene. The AqpZ gene was amplified using gene specific primers with the addition of a tobacco etch virus cleavage site (TEV); ENLYFQSN at the N-terminus of AqpZ. The amplified AqpZ was digested with the enzyme NdeI and BamHI and then ligated to the similarly digested 6-His tagged expression pET28b vector DNA. The positive clones were verified by PCR-screening. The authenticity of the constructs was then confirmed by DNA sequencing. The *E. coli* strain BL21(DE3) was used for expression of the protein. Luria Broth cultures containing 50 µg/ml kanamycin were incubated for 13-16 hours at 37° C., diluted 100-fold into fresh LB broth and propagated to a density of about 1.2-1.5 (OD at 600 nm). Expression of recombinant protein was induced by addition of 1 mM IPTG for 3 hour at 35° C. before centrifugation.

Harvested cells were resuspended in ice-cold binding buffer (20 mM Tris pH 8.0, 50 mM NaCl, 2 mM β-mercaptoethanol, 10% glycerol) in the presence of 0.4 mg/ml lysozyme, 50 units Bensonase and 3% n-octyl β-D-Glucopyranoside. The sample was subjected to five times lysis cycles in a microfluidizer at 12,000 Pa. Insoluble material was pelleted by 30 minutes centrifugation at 40,000×g. The supernatant was passed through a Q-sepharose fast flow column (Amersham Pharmacia), and the flow through was collected. The flow though fraction was topped up with NaCl to 300 mM before loaded onto a pre-equilibrated Ni-NTA column. The column was washed with 100 column volumes of a wash buffer (20 mM Tris pH 8.0, 300 mM NaCl, 25 mM imidazole, 2 mM β-mercaptoethanol, 10% glycerol) to remove non-specifically bound material. Ni-NTA agarose bound material was eluted with five bed volumes of elution buffer (20 mM Tris pH 8.0, 300 mM NaCl, 300 mM imidazole, 2 mM β-mercaptoethanol, 10% glycerol, containing 30 mM n-octyl β-D-Glucopyranoside). AqpZ was further purified with anion exchange chromatography; monoQ column (GE healthcare). The mixture sample was diluted and concentrated to bring the salt and imidazole concentration to approximately 10 mM with Amicon concentrator, membrane cut off 10,000 Da before loading to MonoQ column. The buffer used during anion exchange chromatography were (A) 20 mM Tris pH 8.0, 30 mM OG, 10% glycerol and (B) 20 mM Tris pH 8.0, 1M NaCl, 30 mM OG, 10% glycerol. The eluted peak fractions containing AqpZ from the ion exchange column was pooled. The purified AqpZ was kept frozen at −80° C.

Example 5

Fluorescent Labeling of Spinach SoPIP2; 1 and *E. Coli* Aqp-Z Aquaporins

Aquaporin transmembrane proteins, spinach aquaporin SoPIP2; 1 or *E. Coli* AqpZ, were labeled with Badan™. Synthesis and handling of Badan™-derivatized proteins was carried out under dim light. To carry out the reaction, 10-fold molar excess of Badan™ to SoPIP2; 1 from a 20 mM stock solution of Badan™ (dissolved in dimethylformamide) to a 10 mg/ml protein solution. The reaction was allowed to take place for 20 h at 4° C. with end-over-end rotation. The reaction mixture was desalted for SoPIP2; 1 into PBS, 1% OG, 1% glycerol, pH 7.4 and for Aqp-Z into 20 mM Tris, 30 mM OG, pH 8 on a polyacrylamide gel Econo-Pac 10DG desalting column (Bio-Rad). The resulting fluorescently-labeled aquaporins were stored at 4° C. until use. The Badan™ labeled SoPIP2; 1 or AqpZ were reconstituted into a liquid membrane matrix prepared according to Ex. 1 at a non-ionic detergent-to-protein molar ratio of 1:200.

Example 6

Fluorescence Spectroscopy and Microscopy of Badan™-Aquaporin

Fluorescence spectroscopy was performed using a Varian Cary Eclipse fluorescence spectrometer (Varian Inc., Palo Alto, Calif., USA) with a $\lambda_{ex}$ (excitation wavelength) of 380 nm and emission recorded at 400 to 700 nm. The fluorescence emission properties of Badan™ labeled aquaporin SoPIP2; 1 and AqpZ are sensitive to the polarity of the local environment of the fluorescent probe Badan™. The fluorescence maximum emission yield of Badan™ is blue shifted or red shifted if the local environment around the probe becomes more hydrophobic or hydrophilic, respectively. Saturating amounts of SDS causes a red shift in the maximum emission yield. Emission spectral changes can be quantified comparing the generalized polarization (GP) values for shifted and unshifted fluorescence intensity peaks of Badan™-labeled aquaporins. GP values were calculated by: $GP = I_b - I_g/I_b + I_g$, where $I_b$ and $I_g$ correspond to the intensities at the blue and green edges of the emission spectrum respectively. Fluorescence spectroscopy was performed using a Varian Cary Eclipse fluorescence spectrometer (Varian Inc., Palo Alto, Calif., USA) with a $\lambda_{ex}$ (excitation wavelength) of 400 nm and emission recorded at 425 to 700 nm. $I_b$ and $I_g$ were calculated from the emission spectra corresponding to the band pass filter range applied for fluorescence confocal microscopy imaging.

FIG. 8 shows a fluorescence image of aquaporin Z labeled with the fluorophore 6-bromoacetyl-2-dimethylaminonaphthalene according to the manufacturer's protocol (Badan™ manufactured by Molecular Probes, Inc., 29851 Willow Creek Road, Eugene, Oreg. 97402-9132, USA) and reconstituted by incorporation into the membrane matrix of the invention. The image was acquired using a Zeiss Axioplan2 upright fluorescence microscope (Carl Zeiss, Jena, Germany) equipped with a Roper Cascade cooled frame-transfer CCD monochrome camera. The filter settings used for image acquisition was 390 nm excitation and 435-465 nm emission filters (blue channel). This monochromatic image clearly shows the presence of labeled Aqp Z protein in the boundary layers or shells surrounding the individual cells of the biomimetic amphiphilic membranes. In addition, the bright field microscopic images of FIGS. 9 and 10 show the unique honeycomb like structure of the matrix having incorporated aquaporins. In contrast, FIG. 11 show a bright field microscope image of a cream phase prepared without any protein. Here it is clearly seen that the material consists of separate vesicles.

Other useful naphthalene probes are listed in the table below.

TABLE 3

Fluorescent environmental sensitive thiol-reactive naphthalene-derivatives:

| Trade name: | Chemical name: |
|---|---|
| Badan | 6-Bromoacetyl-2-dimethylaminonaphthalene |
| Acrylodan | 6-acrylolyl-2-dimethylamino-naphtalene |
| Laurdan | 6-Dodecanoyl-2-dimethylaminonaphthalene |
| Prodan | 6-Propionyl-2-dimethylaminonaphthalene |
| 1,5-IAEDANS | 5-((((2-iodoacetyl)amino)ethyl)amino)naphthalene-1-sulfonic acid |
| IAANS | 2-(4'-(iodoacetamido)anilino)naphthalene-6-sulfonic acid |
| MIANS | 2-(4'-maleimidylanilino)naphthalene-6-sulfonic acid, sodium salt |

Example 7

Use of the Liquid Membrane Matrix of the Invention as a Biosensor for Use in Immunological Assays and for Drug Discovery in Infectious Diseases The major outer-membrane protein of *Fusobacterium nucleatum*, FomA, is a trimeric protein, which exhibits permeability properties similar to that of other enterobacterial diffusion porins. Each FomA monomer depicts the beta-barrel motif typical of diffusion porins, consisting of 16 antiparallel beta-strands. The FomA porins function as voltage-dependent channel proteins. A liquid membrane matrix having functional lipid membrane incorporated FomA channels can be prepared according to Example 1 above.

A FomA sensor assay will be constructed as a liquid membrane matrix assay and hereafter used as patch clamp device for monitoring sensing. Such a patch-clamp device could for example be an automated patch clamp device developed as a port-a-patch patch clamp device (Nanion Technologies GmbH, Munich, Germany. The FomA porin is a potential drug target which may be useful in drug discovery in Gram-negative bacteria infectious diseases or in Immunological assays. Our preliminary studies have shown that FomA may be blocked by cyclodextrins. This has never previously been described for FomA. The unique feature of cyclodextrin blocking of FomA may be applied to create FomA-based stochastic sensing assays. Certain drugs like anti-depressant drugs may bind to cyclodextrins (Li-Qun Gu et al 2000), which in turn may be registered by the protein, which in this case FomA.

Example 8

Use of the Liquid Membrane Matrix of the Invention in a System for Hemodialysis

The kidneys are organs with important functions in many animals including vertebrates and also some invertebrates. Their function is to remove waste products from the blood, and as such represent a natural filter of the blood. In producing urine, the kidneys excrete wastes such as urea and ammonium; the kidneys also are responsible for the re-absorption of water, glucose, and amino acids. Each day 180 L of water enters the kidneys, and almost all that water volume is reclaimed (ca. 0.5 L excreted). The salt concentration of urine can be as much as 4 times higher that of blood. The reasons for water reclamation and salt up-concentration in urine are related to the architecture of the kidneys and the function of aquaporins. The kidneys function as a sophisticated forward osmosis system. In the kidney, the thin ascending limb, the thick ascending limb and distal tubule are highly water impermeable, while the other segments are water permeable. This creates a salt gradient across the kidney which is the driving force for the osmosis processes that is necessary for normal renal function.

In this context, aquaporins are abundant in the proximal tubule and the collecting duct. The latter is responsible for water re-absorption and up concentration of the salt in urine compared to that of blood. In renal failure the kidneys fail to function adequately, and may be due to a number of medical problems. Haemodialysis is a medical method for removing waste products such as ions (e.g. $K^+$ and $PO_4^{3-}$) and urea, as well as free water from the blood of a patient with renal failure.

In hemodialysis, a sterilized dialysis solution of mineral ions is used in a forward osmosis process to remove said waste products through a semipermeable membrane. However, excess water is simultaneously removed from the blood and this must be replenished. Thus, purified water is necessary in hemodialysis. In addition, dialysis patients are exposed to vast quantities of water which is mixed with dialysate concentrate to form the dialysate, where even trace mineral contaminants or bacterial endotoxins can filter into the patient's blood. Even very low concentrations of metal ions, such as aluminium ions stemming from glass ware, as well as low levels of endotoxins, have all caused problems in this regard. For this reason, water used in hemodialysis is carefully purified before use. One purification step involves forcing water through a microporous reverse osmosis membrane. In this way small solutes such as electrolytes are filtered off. Final removal of leftover electrolytes may be done by passing the water through a tank with ion-exchange resins, which remove any leftover anions or cations and replace them with hydroxyl and hydrogen molecules, respectively, leaving ultrapure water.

Even this degree of water purification may be insufficient. The trend lately is to pass this final purified water (after mixing with dialysate concentrate) through a dialyzer membrane. This provides another layer of protection by removing impurities, especially those of bacterial origin that may have accumulated in the water after its passage through the original water purification system.

There are at least two useful applications of the liquid membrane matrix of the invention in improvement of hemodialysis methods:

Production of ultrapure water as described herein can replace the very elaborate systems for water purification that are in use in hemodialysis; and following the forward osmosis process described above, where large amounts of water stemming from the patient's blood plasma is simultaneously removed, this may be extracted using an aquaporin liquid membrane in any of the methods described herein. For this purpose, a salt gradient and a counter current will be created mimicking the normal kidney function across the liquid membrane of the invention, which will then constitute the necessary driving force for the forward osmosis processes. This will ensure re-use of the patient's own plasma water and eliminate the risks from contaminants present in external water, however purified it may be.

Example 9

Forward Osmosis Water Extraction and Salt Exclusion Filtration Experiment Using SoPIP2; 1

In an experiment using the system as shown in FIG. 7 and a membrane cell as shown in FIG. 1 herein 400 µl of SoPIP2; 1 emulsion was injected between support or encapsulation membranes, GPHV 0.22 µm pore size hydrophobic, purchased from Millipore. The emulsion was prepared as described in Example above combining 2292 µl of a 100 mg/ml solution of Pluronic F108 (BASF Ludwigshafen, Germany) in PBS, 154 µl SoPIP2; 1 protein 12 mg/ml purified according to Törnroth-Horsefield et al. 2006 and 815 µl of squalene followed by rotation over night. The feed solution was MilliQ water and the draw solution was a solution of 1M NaCl 1.897 Osmol/kg and maintaining a cross flow over the encapsulated membrane of 80 ml/min of both feed and draw solutions. Pluronic F108 has the same general block copolymer formula as Pluronic F68 wherein the average PO value is 51.36, and the average EO value is 270.84. The osmotic filtration experiment ran for more than 110 hours and showed an average water flux, Jw of up to about 5 $kg/m^2$ h and an average low salt flux, Js of below 0.5 $g/m^2$ h.

While the foregoing invention has been described in some detail for purposes of clarity and understanding, it will be clear to one skilled in the art from a reading of this disclosure that various changes in form and detail may be made. For example, all the techniques and apparatus described above can be used in various combinations. All publications, patents, patent applications, and/or other documents cited in this application are incorporated by reference in their entirety for all purposes to the same extent as if each individual publication, patent, patent application, and/or other document were individually indicated to be incorporated by reference for all purposes.

REFERENCES

U.S. Pat. No. 4,360,448 (A) "Water in oil emulsions useful in liquid membrane", Publication date: 1982 Nov. 23, Inventor(s): Li Norman N; Cahn Robert P; Shrier Adam L, Applicant(s): Exxon Research Engineering Co.

U.S. Pat. No. 3,740,421 "Polyoxyethylene.polyoxypropylene Aqueous Gels". Inventor(s): Irving R. Schmolka.

WO/1987/002380 "Production of Low-Ethanol Beverages by Membrane Extraction", Publication Date: 23 Apr. 1987, Inventor: MATSON, Stephen, L, Applicant: SEPRACOR, INC. [US/US]; 33 Locke Drive, Marlborough, Mass. 01752 (US).

WO/2009/076174 "highly permeable polymeric membranes", publication date: 18 Jun. 2009, inventors: KUMAR, Manish, CLARK, Mark, M., ZILLES, Julie, BRZELAKOWSKI, Mariusz, NEHRING, Rainer, MEIER, Wolfgang.

Tamir Gonen and Thomas Walz, Quarterly Reviews of Biophysics (2006), 39:4:361-396, Cambridge University Press.

Cath et al., Journal of Membrane Science, 281 (2006) 70-87.

http://sschi.chtf.stuba.sk/MembraneLab/Equipment.htm.

McGinnis and Elimelech, Desalination, 207 (2007) 370-382.

Monica A. James-Smith et al. J Surfact Deterg (2008) 11:237-242.

Quirin Schiermeier, "Purification with a pinch of salt", Nature, 452, 20 Mar. 2008.

Manuel Aguilar & Jose Luis Cortina "Solvent Extraction and Liquid Membranes", CRC Press, 2008.

Judge S I, Bever C T (July 2006). "Potassium channel blockers in multiple sclerosis: neuronal Kv channels and effects of symptomatic treatment". Pharmacol. Ther. 111 (1): 224-59.

Karlsson, M. et al. FEBS Letters 537 (2003) 68-72.

Analytical and bioanalytical chemistry [1618-2642] Hansen yr: 2009 vol: 395 iss: 3 pg: 719. Preliminary studies of seawater desalination using forward osmosis. Low, S. C. Desalination and Water Treatment (2009), 7(1-3), 41-46.

Norbert Maurer et al., Biophysical Journal, Volume 80, May 2001, pp 2310-2326

D. Deamer and A. D. Bangham, Biochimica et Biophysica Acta (BBA)—Biomembranes Volume 443, Issue 3, 7 Sep. 1976, Pages 629-634

Szoka, F. & Papahadjopoulos, D. (1980) Annu. Rev. Biophys. Bioeng. 9, 467-508)

Chuyang Y. Tang, Qianhong She Winson C. L. Lay, Rong Wang and Anthony G. Fane. Journal of Membrane Science, Volume 354, Issues 1-2, 15 May 2010, Pages 123-133

The invention claimed is:

1. A liquid membrane matrix comprising a cellular structure having an internal water phase, an external oil phase, and a boundary layer between cells comprising an amphiphilic non-ionic detergent and one or more amphiphilic lipid components, wherein aquaporin or aquaglyceroporin water channels have been incorporated in the boundary layer between the cells of the liquid membrane matrix and wherein the molar ratio of protein to amphiphilic non-ionic detergent in the boundary layer is between 1:50 and 1:400.

2. The liquid membrane matrix according to claim 1, wherein said oil phase comprises components selected from the group consisting of a sterol, squalene, squalane, alpha-tocopherol, hopanoids, isoprenes, glycerol, ubiquinone, jojoba oil, light mineral oils, linseed oil, soybean oil, ground nut oil, phospholipid stabilized squalene, an emulsion of soy bean oil, phospholipids and glycerol, and alkanes.

3. The liquid membrane matrix according to claim 1 or 2, wherein said detergent is a hydrophile-hydrophobe-hydrophile (A-B-A) type poloxamer.

4. The liquid membrane matrix according to claim 3, wherein said poloxamer is selected from $(PEO)_A$-$(PPO)_B$-$(PEO)_A$ copolymers having an A range of about 60 to about 135 and a B range of about 25 to about 51.

5. The liquid membrane matrix of claim 4, wherein A is an average value of about 76 or about 135, and B is an average value of about 30 or about 51.

6. The liquid membrane matrix according to claim 2, wherein said alkane is selected from the group consisting of decane, undedane, dodecane, and mixtures thereof.

7. The liquid membrane matrix according to claim 1 having cells with an approximate maximal diameter of 1000 µm.

8. The liquid membrane matrix according to claim 7, wherein the majority of cells have a diameter in the range of about 20 to about 50 µm.

9. A method of extracting water from an aqueous liquid comprising the following steps:
a) placing an amount of the liquid membrane matrix according to claim 1 into a filter chamber which is in controlled connection with a first aqueous liquid feed solution having an osmotic pressure which is lower than or equal to that of the liquid membrane matrix, and which is further in connection with a second aqueous liquid draw solution having an osmotic pressure which is higher than that of the matrix to create an osmotic pressure potential between said first and said second liquid,
b) allowing the matrix to absorb pure water from said first liquid and to mediate a pure water flux into said second liquid as long as an osmotic pressure gradient exists, and
c) optionally separating the extracted pure water from said second liquid.

10. The method according to claim 9, wherein said first aqueous liquid is selected from the group consisting of any type of natural water source, waste water which is not toxic to an aquaporin water channel, and biological fluids.

11. The method of claim 9 or 10, wherein the method is used for desalination of seawater, wherein salt water is the feed or first aqueous liquid and a $CO_2/NH_3$ containing aqueous solution is the draw solution or second aqueous liquid.

12. The method according to claim 10, wherein said first aqueous liquid is selected from the group consisting of sea water, river water, lake water, brackish water, rain water, wine, fruit and vegetable juice, milk, whole blood, plasma, urine, saliva, sweat, and homogenized tissue.

13. An apparatus for pure water extraction from an aqueous liquid media which comprises one or more liquid membrane matrices according to claim 1.

14. A method of preparing a liquid membrane matrix of claim 1, wherein said liquid membrane matrix is suitable for extraction of water from a liquid medium using forward osmosis, the method comprising combining an aqueous solution of the amphiphilic non-ionic detergent with a buffered aqueous aquaporin protein preparation and an oil followed by end-over-end mixing and allowing the resulting emulsion to separate and extracting the generated extended oil/water interphase which constitutes said liquid membrane matrix.

15. A method for pure water extraction from an aqueous liquid media comprising contacting a liquid membrane matrix prepared according to claim 1 with an aqueous liquid media, and allowing extraction of pure water through forward osmosis.

16. A method for re-extraction of pure water from a patient's plasma lost through hemodialysis comprising contacting a liquid membrane matrix according to claim 1 with a patient's plasma lost through hemodialysis, thereby extracting pure water.

17. A supported liquid membrane matrix having a closed sandwich construction, wherein a substantially flat porous filter material provides support on both sides of a layer of said matrix according to claim 1, thereby immobilising the layer.

18. A composite filter membrane or disk created by sandwiching a layer of aquaporin containing liquid membrane matrix according to claim 1 in between filter materials selected from ultrafiltration membranes and microfiltration membranes.

19. The liquid matrix according to claim 1, wherein the one or more amphiphilic lipid components are selected from the group consisting of phospholipids, phosphoglycerides, sphingolipids, cardiolipin, natural lipid extracts, *E. coli* total lipid extract, soybean mixed phospholipids, and combinations or mixtures thereof.

20. The liquid membrane of claim 19, wherein said phospholipids are 1,2-dipalmitoyl-sn-phosphatidylcholine (DPPC), DOPC, DPhPC, or DOPS.

21. The liquid membrane matrix according to claim 1, wherein said aquaporin or aquaglyceroporin water channel is selected from the group consisting of Aqy1, SoPIP2;1, and AqpZ and monomeric, dimeric, tetrameric and higher oligomers thereof.

22. The liquid membrane matrix according to claim 1, wherein said amphiphilic non-ionic detergent is an amphiphilic block copolymer.

23. The liquid membrane matrix according to claim 22, wherein the amphiphilic block copolymer is a poloxamer.

24. The liquid membrane matrix according to claim 1, wherein said oil phase comprises a non-polar hydrocarbon solvent.

25. A supported liquid membrane matrix having an open sandwich construction, wherein a substantially flat porous filter material provides support on one side of a layer of a liquid membrane matrix according to claim 1 thereby immobilising the layer.

26. An apparatus for pure water extraction from an aqueous liquid media said apparatus having a filter house comprising one or more aquaporin containing liquid membrane matrices according to claim 1.

27. The apparatus according to claim 26, wherein the apparatus is a hollow fiber module.

28. The apparatus according to claim 26, wherein the apparatus is a two module hollow fiber supported liquid membrane contactor module or a liquid-liquid cell membrane contactor.

* * * * *